United States Patent [19]

Blaukovitsch

[11] Patent Number: 5,905,709
[45] Date of Patent: May 18, 1999

[54] MASS PRODUCTION OF MULTISESSION DISCS FOR PLAYBACK ON AUDIO-ONLY AND CD-ROM PLAYERS

[75] Inventor: Reinhard Hermann Blaukovitsch, Terre Haute, Ind.

[73] Assignees: Sony Corporation, Tokyo, Japan; Digital Audio Disc Corporation, Terre Haute, Ind.

[21] Appl. No.: 08/889,945

[22] Filed: Jul. 10, 1997

Related U.S. Application Data

[62] Division of application No. 08/471,982, Jun. 6, 1995, Pat. No. 5,661,715, which is a division of application No. 08/324,406, Oct. 20, 1994, abandoned.

[51] Int. Cl.⁶ ........................................... G11B 7/24
[52] U.S. Cl. ........................... 369/275.4; 369/49
[58] Field of Search ................ 369/275.4, 275.2, 369/275.1, 13, 49, 275.3, 84, 59, 71, 54, 110–112, 119, 44.14, 44.39, 44.32; 430/320, 321; 360/19.1, 72.2; 358/342

[56] References Cited

U.S. PATENT DOCUMENTS

| | | | |
|---|---|---|---|
| 4,150,398 | 4/1979 | Kojima et al. | 369/84 |
| 4,164,754 | 8/1979 | Dubois | 430/320 |
| 4,833,548 | 5/1989 | Watanabe | 369/54 X |
| 4,872,068 | 10/1989 | Ishii et al. | 360/72.1 X |
| 4,893,193 | 1/1990 | Nakamura et al. | 369/49 |
| 4,914,523 | 4/1990 | Maruta | 358/310 |
| 4,977,550 | 12/1990 | Furuya et al. | 369/32 |
| 5,009,818 | 4/1991 | Arai et al. | 264/1.003 |
| 5,010,417 | 4/1991 | Yoshio et al. | 358/335 |
| 5,079,651 | 1/1992 | Tsuchida et al. | 360/72.2 |
| 5,121,269 | 6/1992 | Tsuchida et al. | 360/72.2 |
| 5,130,966 | 7/1992 | Yoshio et al. | 369/59 |
| 5,138,925 | 8/1992 | Koguchi et al. | 84/609 |
| 5,161,251 | 11/1992 | Mankovitz | 455/76 |
| 5,168,486 | 12/1992 | Yanagawa | 369/44.14 |
| 5,189,237 | 2/1993 | Koguchi | 84/609 |
| 5,218,455 | 6/1993 | Kristy | 358/403 |
| 5,225,618 | 7/1993 | Wadhams | 84/602 |
| 5,241,659 | 8/1993 | Parulski et al. | 395/164 |
| 5,243,582 | 9/1993 | Yamauchi et al. | 369/32 |
| 5,245,600 | 9/1993 | Yamauchi et al. | 369/49 |
| 5,270,831 | 12/1993 | Parulski et al. | 358/403 |
| 5,312,718 | 5/1994 | Ledieu et al. | 430/320 |
| 5,325,352 | 6/1994 | Matsumoto | 369/275.3 |
| 5,336,844 | 8/1994 | Yamauchi et al. | 84/602 |
| 5,414,688 | 5/1995 | Inokuchi | 369/84 |
| 5,452,282 | 9/1995 | Abraham | 430/1 |
| 5,493,548 | 2/1996 | Kamioka | 369/84 |
| 5,499,228 | 3/1996 | Takeda | 369/71 |

FOREIGN PATENT DOCUMENTS

| | | |
|---|---|---|
| 165320 | 12/1985 | European Pat. Off. . |
| 547633 | 6/1993 | European Pat. Off. . |
| 553013 | 7/1993 | European Pat. Off. . |
| 595055 | 5/1994 | European Pat. Off. . |
| 642 121 | 3/1995 | European Pat. Off. . |
| 4140712 | 10/1992 | Germany . |
| 3801136 | 7/1993 | Germany . |
| 57-172552 | 10/1982 | Japan . |
| 92/05504 | 9/1991 | WIPO . |

OTHER PUBLICATIONS

Meridian Data, Inc., *CD Master User's Guide*, available from Meridian Data, 5615 Scotts Valley Drive, Scotts Valley, CA 95066.

Jeffrey A. Trachtenberg, *Sony, Microsoft, Philips Work On Music CDs*, Wall Street Journal, Oct. 17, 1994.

*Primary Examiner*—Ali Neyzari
*Attorney, Agent, or Firm*—Wood, Herron & Evans, L.L.P.

[57] ABSTRACT

A mass-manufactured disc containing audio and non-audio data, the audio portion of which can be satisfactorily played by an audio-only player without playing the non-audio portion. The disc is mass-manufactured from a patterned glassmaster by either (1) generating suitable multisession-formatted data and subcode information and writing this data onto the glassmaster, or (2) reading data stored on a write-once multisession disc and writing this data directly onto the glassmaster.

14 Claims, 5 Drawing Sheets

Microfiche Appendix Included
(15 Microfiche, 1394 Pages)

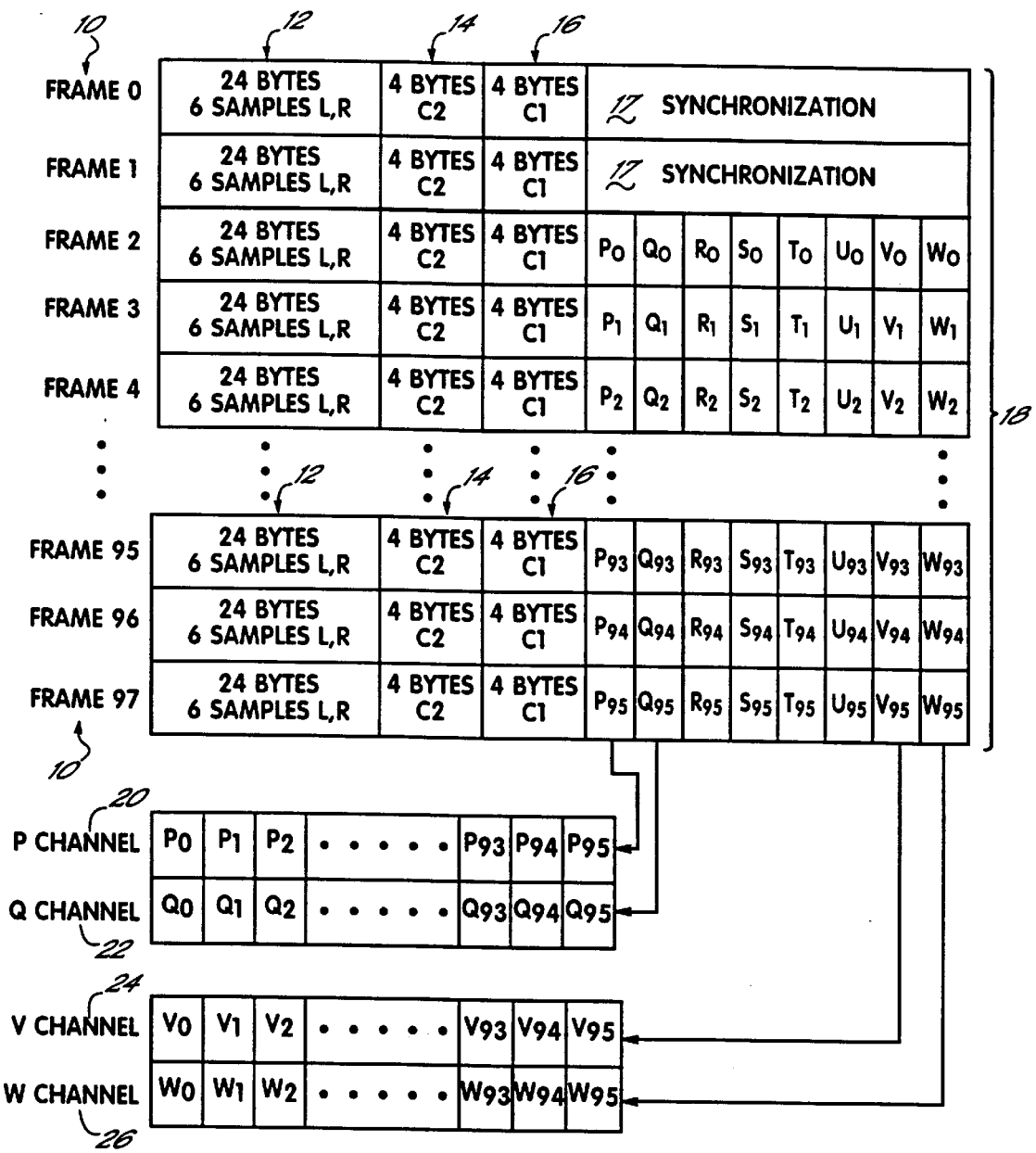
FIG. 1
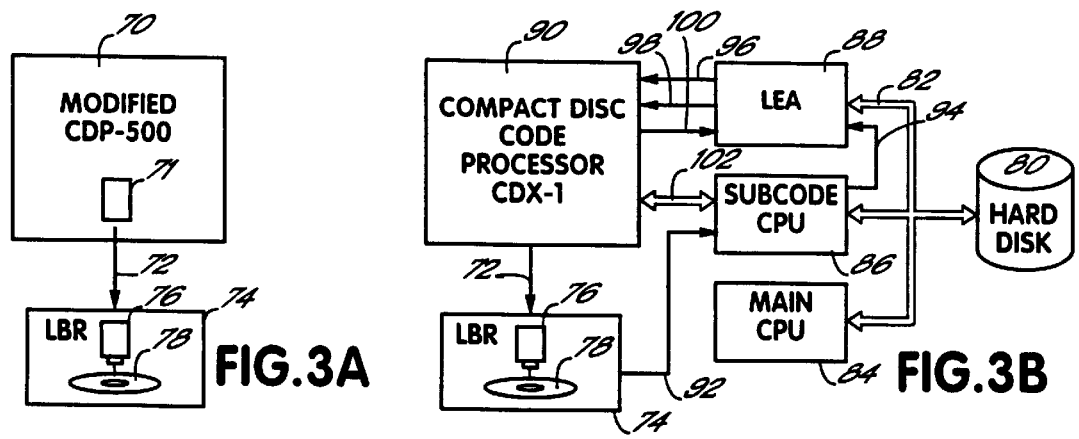
FIG. 3A
FIG. 3B

MASS PRODUCTION OF MULTISESSION DISCS FOR PLAYBACK ON AUDIO-ONLY AND CD-ROM PLAYERS

This is a divisional application of application Ser. No. 08/471,982 filed on Jun. 6,1995, for MASS PRODUCTION OF MULTISESSION DISCS FOR PLAYBACK ON AUDIO-ONLY AND CD-ROM PLAYERS, now U.S. Pat. No. 5,661,715, which is a divisional of application Ser. No. 08/324,406, filed on Oct. 20, 1994, now abandoned.

A microfiche appendix, 15 microfiche and 1394 frames, is attached to this application.

FIELD OF THE INVENTION

The present invention relates to mastering of digital compact discs.

BACKGROUND OF THE INVENTION

In the past ten years, compact discs (CDs) have become a dominant format for distribution of music recordings, due to their compact size and high-quality digital reproduction of music.

Conventional, mass-produced CDs store data as a pattern of pits and lands, representing digital "1"'s and "0"'s, following spiral tracks on a reflective surface of the disc. To read the CD, a read laser scans the reflective surface, detects the pits and lands by changes in reflection from the disc surface, and decodes the digital information. CDs are mass-produced by first patterning a photoresistive surface of a glassmaster (using a laser beam) with a pattern of pits and lands indicating the data recorded on the disc. This pattern is then embossed or stamped into a reflective material such as polycarbonate, which is then encased in a protective plastic coating.

Although audio reproduction was the primary motivation for development of the CD, because CDs store vast volumes of digital information (approximately 600 million eight-bit bytes), and because of cost reductions resulting from the popularity of audio CDs, the CD has recently become a preferred form for storing data for a computer in the form of read only memory (CD-ROM). As a result, there are now a number of formats in which CD information is stored.

The format in which audio information is stored on a CD is known as the "redbook" standard. Under redbook, digital data on a CD is organized into indexed tracks. The digital samples for left and right audio channels are interleaved with error correcting codes and subcode data. Throughout the disc, the interleaved subcode information identifies the current position, in minutes and seconds, both with respect to the current track and with respect to the entire disc. The subcode also includes information indicating the beginning and end of tracks. Furthermore, in a lead-in section preceding the first track (encoded with audio silence), the interleaved subcode information includes a table of contents identifying the position of each track in the remainder of the disc. And, in a lead-out section following the final track on the disc, the interleaved subcode information includes special encoding indicating the end of the program material.

The so-called "yellowbook" standard is typically used as a format for a CD-ROM. The "yellowbook" format is similar to the "redbook" format in many respects, including the use of data organized into tracks, interleaved with error correction and subcode information. The interleaved subcode identifies, in minutes and seconds, the current position with respect to the track and the disc as a whole, as well as information indicating the beginning and end of a track. Furthermore, the disc includes a lead-in section including (in the subcode) a table of contents, and a lead-out section indicating (in the subcode) the end of the information encoded on the disc. The primary differences between the redbook and yellowbook formats (other than the nature of the stored data) are the inclusion, in yellowbook discs, of extra error correction information, and a marker in the subcode in the lead-in indicating that the disc is a CD-ROM rather than an audio CD.

A relatively new extension of yellowbook, known as CD-XA, was developed for CD-RO[]s which carry multiple different kinds of data, for example, audio, video, and text data. In a CD-XA disc, each track contains interleaved video, audio, text, and other types of data A CD-XA compatible player can combine the audio, video, and text in real-time into a single multimedia output.

Furthermore, a so-called multi-session format was developed for use with user-recordable CDs. Recordable CDs begin as a blank disc with a normally-reflective, heat sensitive surface. These blank discs are written by heating the surface of the disc with a high power laser beam, causing heat-induced chemical change in the reflectivity of the surface. The resulting pattern of reflective and nonreflective areas can be read by the laser in a CD player. It is not possible to reverse the chemical changes which modify the surface reflectivity of the disc and thereby stores information. Thus, recordable CDs are a write-once (CD-WO) media, i.e., they can only be recorded once, and cannot be erased or re-recorded.

The multi-session format was created to overcome one difficulty arising from CD-WO technology. Specifically the CD formats noted above require encoding a disc with a table of contents indicating the locations of tracks on the disc, and further require a lead-out section indicating the end of information encoded on the disc. This information will necessarily change if the data on the disc changes, i.e., if a track is added to the disc after initial recording. However, as noted above, the data on a recordable CD-WO cannot be changed after initial recording. Thus, using the formats discussed above, all of the information on a recordable CD would have to be recorded at one time, rather than incrementally To overcome this difficulty, the multisession format records multiple, separate tables of contents in multiple, separate sections of the disc. Specifically, the disc includes multiple "sessions", each having a number of tracks, a lead-in section including subcode information describing a table of contents for tracks in the sessions and a lead-out section with subcode information indicating the end of the session. Because there are separate tables of contents for separate sessions on the disc, data can be recorded on the disc incrementally; once a session has been completed (and a corresponding table of contents and lead-out created), that session can be played from the disc by a multisession player notwithstanding whether other sessions have been completed. Furthermore, data can be added to a partially recorded disc by simply adding a new session (or adding tracks to an existing, partially completed session).

One difficulty arising out of this multitude of formats is cross-compatibility of formats with players. For examples if a user places a yellowbook or CD-XA disc in a pre-1986 CD player (i.e., a player designed prior to the emergence of CD-ROM and designed only to play audio CDs), the player will not recognize the codes identifying the disc as a CD-ROM disc, and will attempt to play the tracks on the disc as music. Although the CD-ROM tracks which actually contain music or audio information in redbook format will play properly, CD-ROM tracks containing other data will play as broadband noise, grating the user and potentially damaging the users stereo equipment.

To avoid the scenario described in the preceding paragraph, since about 1986 manufacturers of audio CD players have typically included circuitry which recognizes the unique lead-in coding identifying a CD-ROW track; typically this circuitry prevents the player from producing an output during CD-ROM tracks. Thus, although owners of post-1986 players are spared listening to noise generated by CD-ROH tracks, these tracks will not be skipped; rather they will play as long periods of silence.

It has been suggested to include non-audio data on musical discs as a supplement to, the liner notes typically included with a musical CD. The CD-ROM data could include lyrics, still video, etc. The original redbook standard sets aside some space in the interleaved subcode for such a purpose; however, few discs have made use of this subcode space. Efforts to use subcode space have been frustrated by the limited space available in the subeode, and the low data rate at which subcode information can be retrieved (both are insufficient, for example, to store real-time video).

As noted above, yellowbook or CD-XA formatted discs have been encoded with sound and accompanying video or text. However, for the reasons noted above, post-1986 audio CD players are designed to play silence during CD-ROM tracks on yellowbook or CD-XA discs and pre-1986 audio CD players play the CD-ROM tracks as noise. Therefore, discs formatted with audio, video and data can only be satisfactorily played using a computer and a yellowbook or CD-XA compatible player. As a result, to date only a small number of such discs have been produced.

SUMMARY OF THE INVENTION

In accordance with principles of the present invention, there is provided a mass-produced compact disc which stores audio data combined with non-audio data. The non-audio data is stored separately from the audio data rather than interleaved therewith. A pre- or post- 1986 audio-only player will play the audio data from the disc, and skip the non-audio data, rather than playing silence or noise in response to the non-audio data. The audio and non-audio data will both play only on a suitably configured CD-ROM player.

In one aspect of the invention discussed below the compact disc is mass-manufactured in accordance with the above-mentioned multisession format, using conventional mass production techniques. The audio data is encoded in a first session on the disc. This session will be played by all audio-only players in the same manner as a redbook-formatted disc. Non-audio data is encoded in subsequent sessions. These sessions will not be played by audio-only players, because the subsequent sessions occur after the lead-out section of the first session. Audio-only players will not play any information following the first lead-out. Only players configured to read multisession discs will access the music and the data in the subsequent sessions.

In accordance with one specific aspect, the disc is mass-produced by first encoding the audio and non-audio data in a multisession format on a write once media. Then, the encoded data and other information on the write once media is read from the write once media, and the resulting electrical signal is used to control the patterning of a glassmaster for mass production of discs containing duplicate information.

In accordance with another specific aspect, mass-production of the disc proceeds directly from audio and non-audio data stored in a storage media, by using this data to directly control a laser in patterning a glassmaster. First, two or more tables of contents are generated, the first table of contents identifying a first group of tracks of data and the second table of contents identifying a second group of tracks of data. The first table of contents and the data identified thereby are then output as a control signal to the lasers in the form of a first digitally encoded lead-in containing the table of contents, followed by one or more digitally-encoded tracks containing the data identified by the first lead-in. Then, the second table of contents and the data identified thereby are output as a control signal to the laser, in the form of a second digitally encoded lead-in containing the table of contents followed by one or more digitally-encoded tracks containing the data identified by the lead-in.

The glassmaster, once patterned by either of the above methods, can then be used in mass-production to emboss further discs.

In specific embodiments, the audio tracks and their associated table of contents are recorded on the disc first, followed by the non-audio tracks and their associated table of contents. When thus recorded the audio tracks will play in an audio-only compact disc player, but the non-audio tracks will not play in an audio-only compact disc player. Furthermore, first lead-in is encoded with a pointer identifying the location of a first track following the second lead-in, in accordance with the above-noted multisession format.

The above and other objects and advantages of the present invention shall be made apparent from the accompanying drawings and the description thereof.

BRIEF DESCRIPITON OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 illustrates the structure of data encoded on a compact disc;

FIG. 3A is a block diagram of an apparatus for copying data from a multisession CD-WO disc onto a glassmaster 78 for mass production of the multisession information;

FIG. 3B is a block diagram of an apparatus for generating multisession formatted data and subcode information for writing a glassmaster 78;

DETAILED DESCRIPTION OF SPECIFIC EMBDOIMENTS

Figure 2:
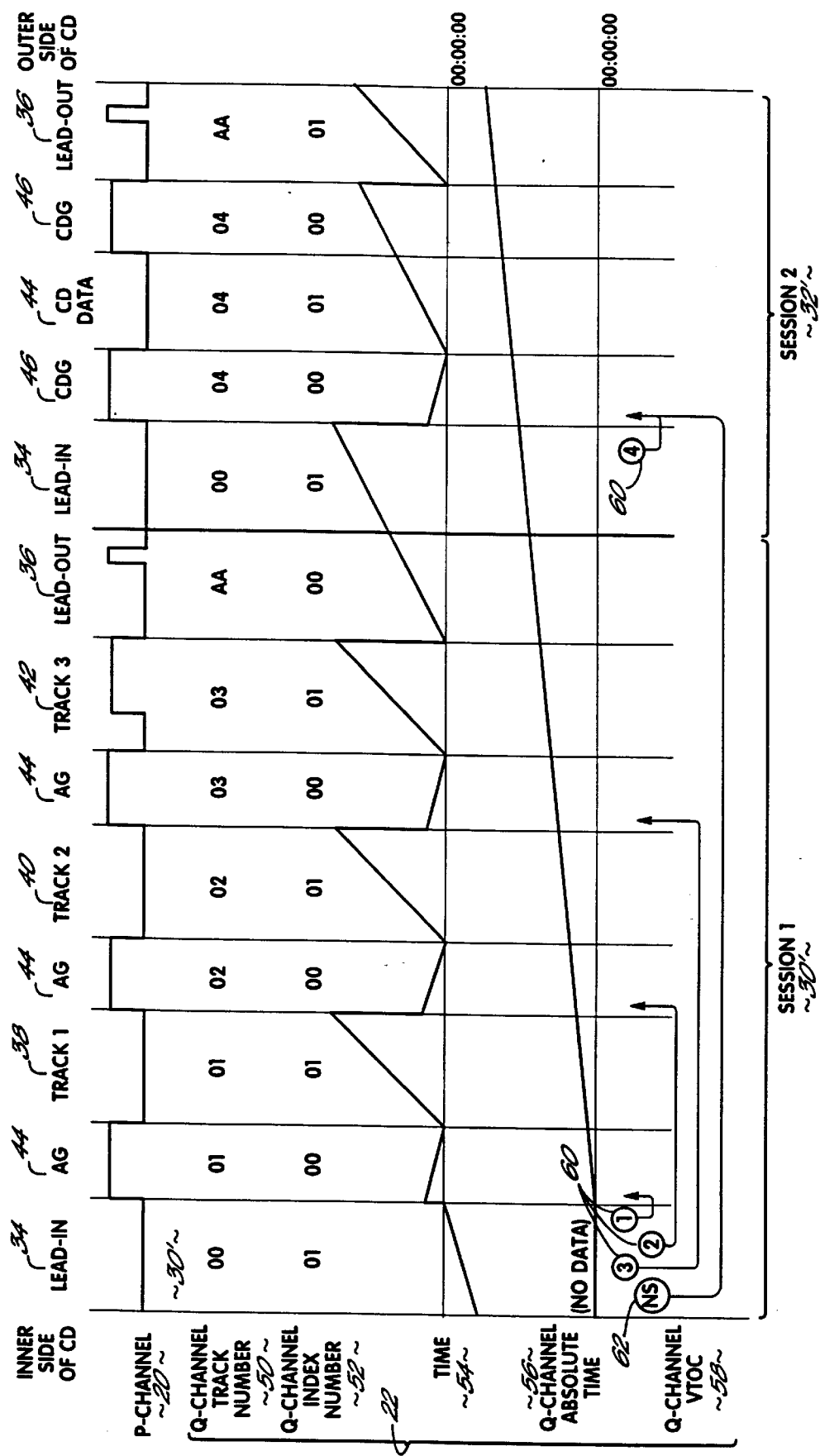
FIG. 2 illustrates the organization of tracks lead-in and lead-out sections on a multisession disc.

Referring to FIG. 1, for background purposes the format of data stored on a compact disc will first be discussed. As seen in FIG. 1, the data on a disc includes a sequence of frames 10. Each frame 10 includes 24 bytes 12 of data, for example arranged into six sixteen-bit (two byte) samples for the left channel and six sixteen-bit (two byte) samples for the right channel These 24 bytes of data 12 are followed by four bytes 14 of a second error correcting code C2 and four bytes 16 of a first error correcting code C1. Following the four bytes 16 is a single byte 17 of synchronization information or, alternatively, a single byte 18 of subcode information. The subcode information includes eight bits referred to individually in the following as bits P, Q, R, S, T, U, V, and W.

Prior to storage on the disc, each eight-bit byte is converted to a fourteen-bit symbol by eight-to-fourteen (EFM) modulation, to reduce the required bandwidth, reduce the DC content of the data, and add synchronization information to the data. Also, three extra bits, known as merging bits, are added to each fourteen-bit symbol to further reduce the DC content of the data.

The thus-encoded frames 10 are stored sequentially on a compact disc, with each frame being preceded and succeeded by another frame. A group of 98 frames such as the group 18 illustrated in FIG. 1 is known as a sector. Each sector begins with two frames having synchronization bytes 17, followed by 96 frames containing subcode bits. At the 44.1 kHz sampling rate used by audio CD, 75 sectors of data comprise one second of music.

As shown in FIG. 1 each of the P subcode bits from the last 96 frames of a sector may be assembled into a single 96 bit word, which is referred to as the P channel 20 of the sector. Similarly the 96 Q bits of a sector are assembled in a sequence to form a Q channel 22. Similar assemblies form the R, S, T and U channels (not shown) and the V channel 24 and the W channel 26.

As discussed in greater detail below, the subcode channels are used to storing a table of contents for a compact disc, and for indexing the disc. This table of contents and index information appears only in P channel 20 and Q channel 22. Channels R through W are reserved for possible future use, and in a typical disc do not contain any information.

Referring to FIG. 2, the typical content of a multi-session disc in accordance with the present invention is illustrated. The disc includes two sessions 30 and 32 each of which contains a lead-in 34, a lead-out 36, and a number of tracks 38, 40, 42 and 44. Tracks 38, 40 and 42 are audio tracks and are contained within the first session 30. Track 44 is a CD-ROM track containing non-audio data and is contained within the second session 32 Tracks 38, 40 and 42 are separated by audio-gap segments 44 which contain audio silence and operate to space in time the material in tracks 38, 40 and 42 when the disc is played by a CD-audio player. CD data track 44 is similarly surrounded by CD gaps 46.

As shown in FIG. 2, the P channel 20 is primarily used as a flag to indicate the beginning of tracks and, in a lead-out 36, to indicate the end of a session. Specifically, during the lead-in 34 all bits in the P channel are at a low or zero value. This zero value is maintained until two seconds prior to the beginning of the first track 38. At this time all bits of P channel 20 change to a one value and remain at a one value until the beginning of the first track 38. At the beginning of the first track 38 all bits of the P channel return to a zero value and remain at this value until two seconds prior to the beginning of the second track 40. In a similar fashion the P channel changes to a one value prior to track 42, and prior to the beginning of the lead-out 36. Also, during the second session 32, the P channel 20 starts at a zero value during the lead-in 34; changes to a one value two seconds prior to the beginning of the CD data track 44, during which it maintains a zero value, and after which it returns to a one value to announce the beginning of the lead-out 36. (The two second pulses prior to each of the tracks 38, 40, 42 and 44 occur, in the example shown in FIG. 2, during the two second audio gaps 44 and CD gaps 46 which precede each of tracks 38, 40, 42 and 44.)

The P channel also serves to indicate the lead-out 36. This is accomplished by modulating the P channel from a zero to a one value in one-half second increments, beginning two seconds after the beginning of the lead-out 36. This modulation of the P channel at a one-half second intervals is detected by a CD player and used to determine that the end of a session has been reached.

The Q channel 22 contains various indexing information related to the data stored on the compact disc. Specifically, the Q channel for a given sector may contain a track number 50, an index number 52 and a track time 54 and an absolute time 56. Alternatively, the Q channel for a sector in a lead-in 34 may include volume table of contents (VTOC) information 58. Furthermore, a Q channel in a track or gap may include a UPC/EAN (universal products code) code for the compact disc. Finally, a Q channel in a track or gap may identify an ISRC code, which is an index number for the data recorded on the compact disc.

The vast majority of Q channels recorded on the disc are formatted to contain track number, track index, and time information. In this format, the Q channel stores a two digit track number for the current track, a two digit index number, for the current index within the current track, a minute and second and sector address for the current sector with respect to the total elapsed time of the current track, and a minute, second and sector address for the current sector with respect to the absolute elapsed time of the entire disc. (Every sector on the disc is associated with a unique minute:second:sector address, where there are 75 sectors in each second and 60 seconds in each minute.)

As shown in FIG. 2 the Q channels in the sectors of the lead-in 34 designate the lead-in as track 00, index 01 (see rows 50, 52 of FIG. 2). The Q channels in the sectors of the audio gap preceding track one, and in the first track 38 itself, designate these areas as track 01 and index numbers 00 and 01. The second track and the audio gap which precedes it are similarly indexed as track 02 and index numbers 00 and 01, respectively. Each lead-out 36 is indexed as track number AA and index number 01. The track numbers increase sequentially through the compact disc sessions, thus CD data track 44 is track number 04.

As further shown in FIG. 2, the Q channels in the lead-in have track time addresses 54 which start at a value equal to the maximum possible address of 99:59:74, minus the duration of the lead-in. This track time address increments linearly through the lead-in, rolling over to a value of 00:00:00 at the first sector following the lead-in. The track time during the lead-in, is often referred to as a negative time address which increments from a negative value to zero, and is therefore represented this way in FIG. 2.

Similarly, throughout each track, lead-in, and lead-out, the Q channel track time addresses increment from a zero value at the beginning of the track, lead-in or lead-out to a maximum value at the and of the track, lead-in or lead-out.

The Q channel does not supply absolute time addresses 56 during the lead-in 34; instead, as described below, pointers to track locations are supplied by the Q channel. For this reason, the absolute time address is often referred to as having a zero value throughout the lead-in 34 of the first session 30. After the first lead-in, the Q channel does supply absolute time addresses 56, which increase from a zero value at the end of the lead-in 34 throughout all the program material in the first and second sessions.

During the lead-in 34 of each session 30 and 32, the Q channels of a given number of sectors include VTOC information 58 in lieu of track number/index and time address information. Thus, the VTOC information in the lead-in 34 of the first session 30 includes pointers 60 which identify the minute:second:sector address at which each of tracks 1, 2 and 3 begins. Similarly, the VTOC information in the lead-in 34 of the second session 32 includes a pointer 60 which identifies the minute:second:sector address at which the fourth track begins.

The VTOC information of the first session 31 also includes a next session pointer 62 which identifies the minute:second:sector address at which the first track of the subsequent session 32 begins. Every session which is followed by a subsequent session includes such a next session pointer; however, the last session does not include such a pointer. Thus, the VTOC information in the lead-in 34 of the second session 32 does not include a next session pointer 62 because session 32 is the last session on the disc.

The 96-bit Q channel of each sector includes an eight-bit control/address byte which indicates the kind of data which is stored in the Q channel. The control address byte is divided into a four bit control nybble, and a four bit address nybble. The control nybble indicates the format in which the disc is recorded. For example, a zero value (0000) in the control nybble indicates that the disc is an audio CD recorded according to the redbook standard; a value of four (0010) in the control nybble indicates that the disc is a CD-ROM, recorded in accordance with the yellowbook standard. The address nybble identifies the type of data found in the remainder of the Q channel. A value of one (0001) indicates that the Q channel includes track number/index information and absolute and track time information. A value of two (0010) indicates that the Q channel includes a UPC/EAN code, a value of three (0011) indicates that the Q channel includes an ISRC code, and a value of five (0101) indicates that the Q channel includes a nrext session pointer 62 to the first track of a following session. Other values of the address nybble are used to indicate that the Q channel includes VTOC data identifying the sector locations of subsequent tracks in the current session.

VTOC data is typically recorded repetitively throughout the lead-in, so that a CD player can obtain the VTOC data by reading a string of sectors anywhere in the lead-in. As a result, the CD player does not need to begin reading the CD at the very beginning of the lead-in, but rather can begin reading at any location in the lead-in. This reduces the mechanical tolerances needed to initialize the location of the CD player's read lasers.

Accordingly, a typical process followed by an audio CD player for playing an audio CD is as follows: when a CD is inserted into the player the player moves its read laser head to the inner most location on the CD, and begins reading the data from the lead-in section 34 at the beginning of the CD. This data is read for several sectors until the player has read, re-read, and verified (from the Q channel) VTOC data 58 for the CD.

The CD player identifies Q channels containing the desired table of contents information by inspecting the address nybble of the control address byte in the Q channel, and reading the Q channels with address nybble values indicating VTOC information. Audio-only CD players ignore those Q channels having address nybbles with other values, for example, those Q channels containing the UPC/EAN and ISRC codes for the disc. As a result, an audio CD player will also ignore Q channels containing a next session pointer 62.

After the audio CD player has determined the table of contents, the player moves its read head to the approximate location of the beginning of the first track, in the example of FIG. 2, to the audio gap 44 preceding track one 38. Then the audio CD player determines, from the value of the P channel, the exact location of the beginning of the first track 38, moves the read head to this location, and then begins playing the audio information in the first track. The audio CD player continues to play the tracks and audio gaps between the tracks until the player reaches the lead-out section 36 which follows the third track 42. At this point the audio CD player will determine that it has reached the lead-out section 36, for example by detecting modulation of the P channel data in the lead-out 36. The audio CD player will then stop playing the CD, having determined that the end of the session has been reached.

In accordance with the foregoing, it can be seen that a typical audio CD player reading a disc formatted in accordance with FIG. 2 will only play the tracks in the first session and will not detect or play the tracks in the second or any subsequent sessions.

In contrast a multi-session player configured specifically to play multi-session discs having a format such as that illustrated in FIG. 2 will be able locate and play the second session. This will occur because a player configured for multi-session discs will detect and decode the next session pointer 62, by reading Q channels in the lead-in having an address nybble with a value of five (0101) and, upon decoding pointer 62 will know that another session follows the current session, and will be able to access tracks in the subsequent session.

Thus, a pre- or post-1986 CD player playing a CD formatted as shown in FIG. 2, will only play the audio tracks found in the first session 30. However, a specially configured multi-session player can play both the audio and non-audio information in both sessions 30 and 32. Thus, so long as the audio information on the disc is encoded in the first session, and no non-audio data is encoded in the first session, the disc formatted shown in FIG. 2 meets the criteria stated above, namely, an audio-only player will play the audio data from the disc without playing the non-audio data, and the non-audio data will only play on a suitably configured CD-ROE player.

The multi-session format illustrated with respect to FIG. 2 is essentially identical to the format used currently for recordable compact disc media (CD-WO). As noted above, this format was created for this specific media, to solve specific problems arising from recordable media, specifically, the need to record data on a disc incrementally rather than in one continuous session. Because mass produced discs are not incrementally recorded, there has been no need or suggestion to use this multisession format on mass produced discs, and no discs have been mass produced in this multisession format.

However, as detailed above, it has now been recognized that the multisession format offers specific advantages in storing audio and non-audio data on a disc in a manner that an audio-only player will play the audio data without playing the non-audio data. Therefore, it will be useful to mass produce discs using this multisession format. Apparatus for mass production of such discs in accordance with principles of the present invention will be set forth in detail below.

In accordance with one embodiment of the present invention, a multi-session disc having a format such as in FIG. 2 can be mass produced by first producing a CD-WO disc using a multi-session recorder, then transferring the multi-session formatted data from the resulting CD-WO disc to a glassmaster.

Referring the FIG. 3A, this process generally involves placing a CD-WO disc into a high-end CD player intended for testing CDs, such as a CDP-5000 player (available from Digital Audio Disc Corporation, a unit of Sony Corporation of America, 1800 North Fruitridge Avenue, Terra Haute, Ind. 47804). High end CD players for testing CDs, such as the CDP-5000, are designed to play an entire CD from beginning to end, without skipping over the lead-in, detecting tracks, or stopping upon detection of the lead-out. Furthermore the CDP-5000 includes an output which produces a serial data stream, representative of the serial data read directly from pits and lands on the disc.

This direct serial data output from the CDP-5000 is connected to the input 72 of a laser beam recorder (LBR) 74, such as a DHC-1100 or -1200 or -1300 (available from DADC, at the address given above). LBR 74 modulates a writing laser 76 to expose a photosensitive surface of a glassmaster 78 thereby producing lands and pits on the surface of glassmaster 78. These lands and pits can then be embossed onto polycarbonate discs in accordance with the standard procedure for mass production of compact discs.

Two modifications must be made to a CDP5000 to read a multi-session disc and produce a suitable input signal on input 72 to LBR 74.

First, a line driver 71 is added to the serial data output of the CDP-5000. A line driver is needed to drive the 50 ohm coaxial cable connecting the CDP-5000 to the input 72 of the laser beam reader 74. This line driver can be, for example, a "75SM121" 50 ohm line driver, available from Texas Instruments, P.O. Box 1443, Houston, Tex. 77251-9879. The line driver is connected to the power supply of the CDP-5000.

Second, the mechanical position sensor of the CDP-5000 tracking servo motor must be moved so that the CDP-5000 read head can move to the very center of the disc. This must be done so that the CDP-5000 will read the disc from the very beginning of the lead-in of the CD-WO disc, rather than from a position in the middle of the lead-in of the CD-WO disc.

To move the CDP-5000 read head into position to read the CD-WO disc, the control lines leading from the CDP-5000 read head motor controller are shorted out, causing the motor to move toward the center of the disc until the read head reaches the (previously adjusted) location of the position sensor. Then, by pressing the play button on the CDP-5000, the CDP-5000 will play the entire CD-WO disc, including the lead-ins, tracks, and lead-outs of every session, producing a serial data stream suitable for driving the input 72 of LBR 74.

While the above described embodiment of the invention has been used to create multi-session discs with conventional mass production techniques, the described method suffers from a number of drawbacks. First, to use this method, the data to be written on the glassmaster 78 must first be written onto a CD-WO disc using a CD-WO recorder, and then the data must be read from the CD-WO recorder and written onto the glassmaster 78. This intermediate step may be inconvenient and unnecessary in situations where the data to be recorded on the glassmaster 78 is not already stored on a CD-WO disc. Second, and perhaps more important, the recording method shown in FIG. 3A does not include error correction. The raw serial data output by the CDP-5000 is not error corrected and therefore, any read errors produced by the CDP-5000 will be recorded directly onto the glassmaster 78. As a result, discs mass produced with the glassmaster 78 will at a minimum include the number of bit errors encountered by the CDP-5000 during the initial reading the CD-WO disc. This error rate can be unacceptably large when combined with the normal error rate of a mass produced CD.

FIG. 3B illustrates an apparatus for directly recording audio and non-audio data onto a glassmaster 78 using an LBR 74. In this embodiment, data to be written onto the glassmaster 78 is stored as files on a hard disc 80 which is connected via a SCSI bus 82 to two CPUs 84 and 86, and a layered error correction augmenter (LEA) 88.

In this embodiment, main CPU 84 is used to generate an overall description of the program material to be written onto the glassmaster 78. This general description may be stored in a job file (having a ".JOB" extension) on hard disk 80. A representative job file is illustrated by attachment A to this patent application.

When the user operating main CPU 84 decides to create a glassmaster 78, the user instructs the main CPU 84 to create a cue sheet identifying the minute:second:sector addresses of each of the tracks, lead-ins, lead-outs, and gaps to be written on the disk, and stores this cue sheet in a second file (having a ".CUE" extension) on hard disk 80. An example of a cue sheet, which corresponds to the to the job file of attachment A, is provided as attachment B to this specification.

After the cue sheet has been written to hard disk 80, subcode CPU 86 reads the cue sheet file and generates in response a more detailed description of the subcode information that will need to be written onto the glassmaster 78. This detailed description is retained in the memory of subcode CPU in the form of a binary-encoded event list. An example of an event list (translated into ASCII characters for easier analysis) is provided as attachment C to this specification.

To create the glassmaster 78, main CPU 84 reads the cue sheets and, in response, reads files from hard disk 80 containing data to be written into tracks on the glassmaster 78, and forwards this data for writing by the LBR 74. During this operation, subcode CPU 86 reads data from its event list, and produces the appropriate subcode information for writing by the LBR 74.

Data from the main CPU is provided to LBR 74 via a layered error augmenter (LEA) 88. LEA 88 buffers the data from the main CPU, and generates error correction coding to be written onto the glassmaster along with the data. (The use of error correction coding in CD formats was discussed above with reference to FIG. 1).

Data and error correction bits from the LEA 88 are combined with subcode information from the subcode CPU 86 by a compact disc code processor 90. Processor 90 combines the data, error correction and subcode information, and produces a serial data stream at the input 72 of the LBR for writing onto the glassmaster. During this process, processor 90 performs EFH modulation and adds three merging bits to the binary information, as noted above, to produce the serial data stream at input 72 of the LBR.

The attached microfiche appendix includes source code for software which runs in main CPU and subcode CPU to perform the operations described above as further detailed by the flow charts discussed below. The microfiche appendix includes source code written in the "C" language, for example for compilation by the Microsoft C compiler version 5.1 for HS-DOS, available from Microsoft, 1 Microsoft Way, Redmond, Wash. 98052-6399. This software is written to operate with the hardware configuration described below. However, the invention in its broader aspects is not limited to this hardware and software configuration. Thus, while the following discussion sets forth a configuration including hardware and software components from various vendors, principles of the present invention could be carried out by similar custom programming of a commercially-available complete CD mastering system, such as is available from Doug Carson & Associates, Inc., 300 North Harrison Street, Suite 102, Cushing, Okla. 74023-1646.

In the specific embodiment for which the software in the microfiche appendix was written, main CPU 84 is an IBM PC architecture computer having an ISA bus, and an 80386 or 80486 microprocessor, such as a Gateway 2000 486/33C Computer, available from Gateway 2000, 610 Gateway Drive, North Sioux City, Iowa 37049. Main CPU is outfitted with a SCSI bus controller expansion card. The card used with the software-in the attached appendix is a Western Digital 7000 card, modified to handle hard disk partitions of up to 700 HBytes, which identifies itself to main CPU with the identifier "MDIWD70". Although the software in the attached appendix is written to communicate with an SCSI card using this identifier, other SCSI controllers could be used to provide this function, by rewriting the software to use a different identifier. SCSI controllers capable of handling hard disk partitions of up to 700 Mbytes are available from Adaptec Inc., 691 South Milpitas Blvd. Milpitas, Calif. 95035.

In the environment for which the software in the attached appendix was written, subcode CPU is an IBM PC architecture computer having an ISA bus and an 80386 microprocessor, such as a Compaq 386/20 Computer available from Compaq, P.O. Box 692000, Houston, Tex. 77269-9976. Subcode CPU is similarly outfitted with an SCSI controller card having the characteristics described in the preceding paragraph.

In the environment used with the software in the attached appendix, the layered error augmenter was a "MDI LEA", available from Meridian Data, Inc., 4450 Capitola Road, Suite 101, Capitola, Calif. 95010. The compact disc code processor 90 was a CDX-1 master code cutter, available from DADC at the address given above Finally, the hard disk 80 was a 700 MByte SCSI hard disk, available from Seagate, 920 Disc drive, Scotts Valley, Calif. 95066.

As noted above, main CPU 84 interacts with subcode CPU 86 and LEA 88 to produce data and subcode information, which is output to the CDX-1 90. CDX-1 90 then produces serial data on input 72 for modulating the laser of LBR 74.

To begin writing data onto a glassmaster, LBR 74 produces a start pulse on a 50 ohm coaxial cable 92 which is connected to subcode CPU 86. In response, subcode CPU 86 (after producing subcode information for the lead-in section of the glassmaster) triggers LEA 88 via a second coaxial cable line 94. LEA then interacts with main CPU 84 to generate data for encoding by CDX-1 90.

LEA 88 outputs data and error correction information on serial data lines 96 and 98 in in response to 44.1 kHz synchronization signals received on a 50 ohm coaxial cable 100 from CDX-1 90. At the same time, subcode CPU 86 produces eight bit subcode information to CDX-1 90 on a ribbon cable 102 in response to 7350 Hz synchronization signals received on ribbon cable 102.

Figure 4:
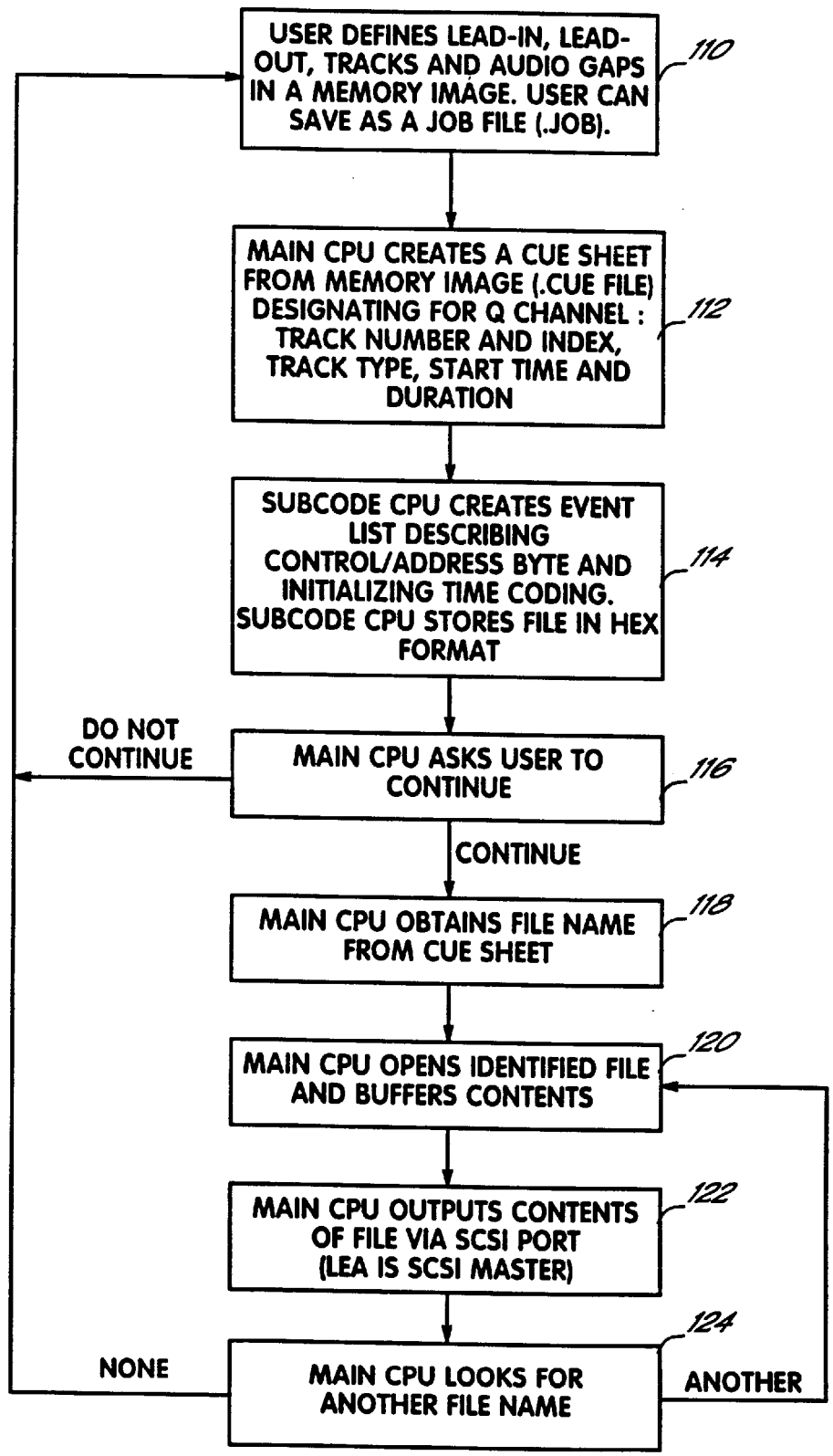
FIG. 4 is a flow chart of the operations performed by the main CPU 84 of FIG. 3B when writing data to a glassmaster.

Referring to FIG. 4, the production of a glassmaster 78 is initiated by a user working at the main CPU 84. In the first step 110 of producing a glassmaster, the user uses software in the main CPU 84 to generally define the format of a multi-session program to be encoded on a glassmaster 78. This information may be stored in a job file (having the extension ".JOB"), of the kind shown in attachment A.

As shown in attachment A, a job file identifies the presence and duration of a lead-in, one or more audio gaps, one or more audio tracks each identified by a file name on hard disk 80, one or more CD-ROM gaps, and one or more CD-ROM tracks each identified by a file name on hard disk 80. Each of the lead-in, lead-out, tracks, and gaps are identified by a separate line in a job file. A user defines the job file 110 by identifying the location and duration of lead-ins and audio gaps, and by selecting from the files available on hard disc 80 to create tracks.

After a job file has been created 110, the user causes the main CPU 84 to create 112 a cue sheet from the job file. This cue sheet is saved as a cue file (having a ".CUE" extension) on hard disk 80. An exemplary cue sheet is illustrated in attachment B. As can be seen in attachment B, a cue sheet indicates the location and duration of each audio gap, audio track, CD gap, CD data track, lead-in and lead-out to be recorded on the disc, by identifying the related track and index numbers, start addresses and durations.

Once the main CPU 84 has created 112 a cue sheet describing the data to be written onto the glassmaster 78, the main CPU 84 instructs the subcode CPU 86 to create 114 an event list. As discussed in further detail below, the event list produced by the subcode CPU specifically details the contents of the subcode to be written onto the glassmaster 78, including the values of the Q and P channels needed to produce subcode information corresponding to the cue sheet. Once created by the subcode CPU, the event list is stored in the memory of the subcode CPU in encoded binary format. attachment C illustrates the contents of a typical event list produced by the subcode CPU, based on from the cue sheet shown in attachment B. The creation and interpretation of the event list shown in attachment C will be discussed in further detail below in connection with FIGS. 5A and 5B.

After causing the subcode CPU to create 114 an event list, the main CPU produces a prompt asking 116 the user whether the user desires to continue and write data to glassmaster 78 using the laser beam recorder 74. If the user elects not to continue the main CPU returns to step 110.

However, if the user elects to continue the main CPU continues obtains 118 the name of the first file on hard disk 80 identified in the cue sheet. Next, the main CPU opens 120 the file, buffers the contents of the file and then begins outputting 122 the contents of the file to LEA 88 via the SCSI bus 82. During this procedure, the LEA operates as the bus master, that is, the LEA controls the rate at which data flows from the main CPU into LEA 88. Main CPU 84 will remain at step 122, attempting to output the contents of a file via its SCSI port, until LEA 88 has permitted all data from the file to be received through the SCSI bus 82. Once this has happened main CPU 84 looks 124 for another file name identified in the cue sheet. If there is another file identified in the cue sheet, the main CPU returns to step 120, opens the identified file and begins attempting to output the contents of the identified file to LEA 88. If no additional files are found in the cue sheet, the main CPU, having output all of the data to the LEA 88, returns to step 11C to begin the process of defining new program material to be written to another glassmaster 78.

Figure 5A:
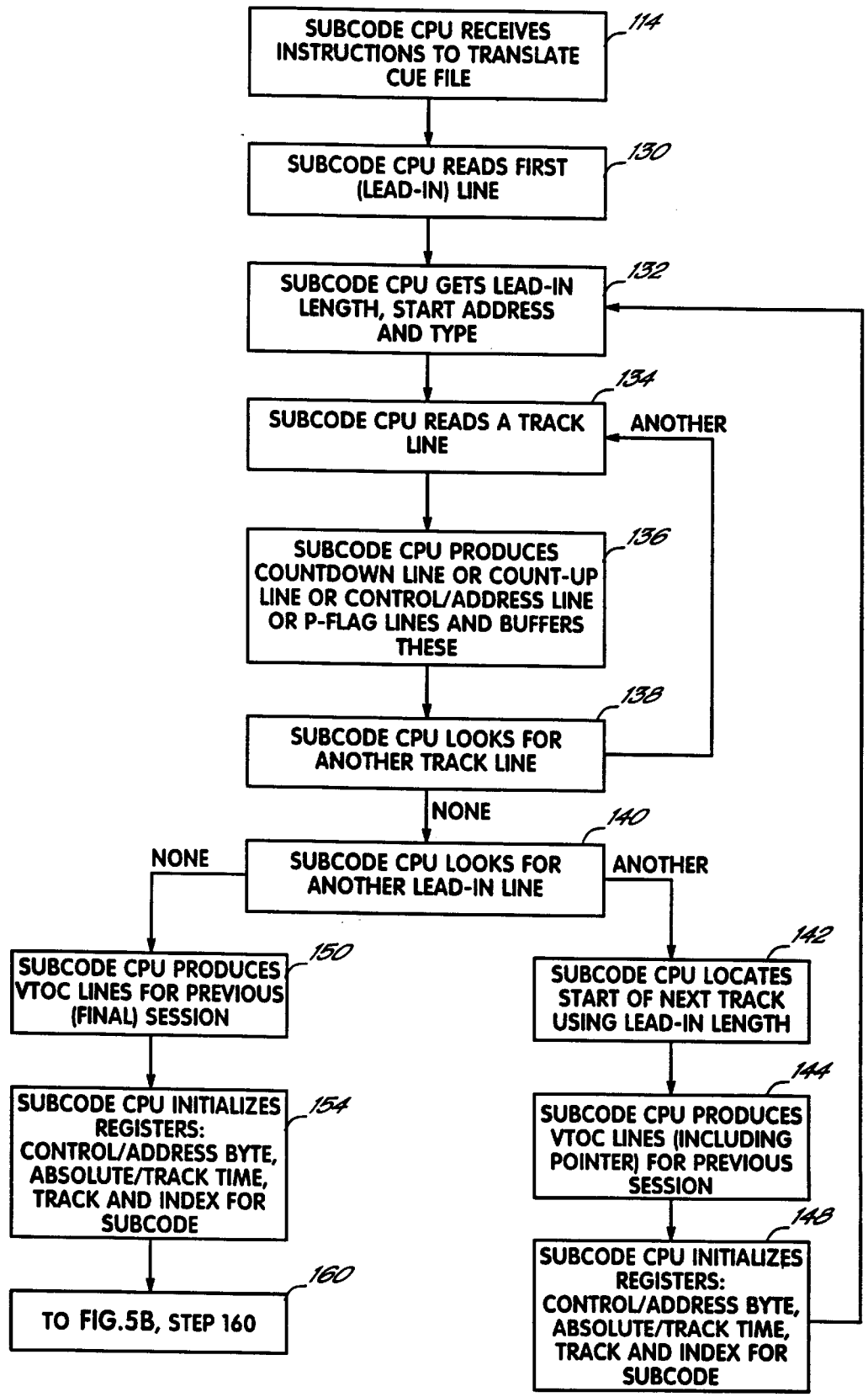
FIGS. 5A and 5B are flow charts of the operations performed by subcode CPU 86 of FIG. 3B when writing data to a glassmaster.

Referring to FIG. 5A, upon receiving an instruction from the main CPU to create an event list (step 114, FIG. 4) the subcode CPU begins reading 130 the cue sheet such as the cue sheet shown in attachment B.

The first line read from the cue sheet should be a lead-in line identifying a lead-in of a session (i.e., a line having "lead-in" in the "type" column of the cue sheet illustrated in attachment B). Upon reading 132 this lead-in line the subcode CPU determines the length of the lead-in (available from the "duration" column of the cue sheet illustrated in attachment B), the start address of the lead-in (available from the "start" column of the cue sheet illustrated in attachment B), and the type of information encoded in the session (determined by reviewing the entries in the "type" column of the cue sheet). Thereafter, the subcode CPU reads 134 each line following the lead-in (each line corresponding to a track or gap to be recorded on the glassmaster), and produces 136 event list lines, such as lines 146 illustrated in attachment C, indicating the P channel and Q channel information that should accompany these tracks or gaps. (The format of the data in the event list will be discussed in further detail below in connection with FIG. 5B.) These event list lines are buffered as they are created.

The subcode CPU iterates through a loop, continually looking 138 for additional track lines in the current sessions reading 134 the additional track lines and producing 136 additional event list lines.

When, during this operation, the subcode CPU reaches the last track of a session, such as the third track shown in the cue sheet of attachment B, the subcode CPU looks 140 for a subsequent lead-in line indicating a subsequent session to be encoded. If such a subsequent session exists, the subcode CPU then locates 142 the start of the first track in the next session (using the length of the lead-in identified by the cue sheet). From this, the subcode CPU derives the value of a next session pointer 62 (FIG. 2) to be encoded into the volume table of contents (VTOC) of the previously-scanned session. Subcode CPU 86 then produces VTOC lines for the event list, such as the lines 157 shown in attachment C, and stores these with the previously-buffered event lines As discussed in further detail below, these VTOC lines identify data to be stored in the VTOC of the just completed session.

After thus creating event lines and VTOC lines the subcode CPU initializes various registers which are used in generating subcode information, as discussed in further detail below with reference to step 154. This done, the subcode CPU returns to step 132, and begins reading the lead-in, track, and gap lines for the next session, so that additional event lines (such as event lines 152 in attachment C) can be buffered for the subsequent session.

When the subcode CPU reaches the end of the last session defined by the cue sheet, and looks 140 for a subsequent lead-in line, it will not find any subsequent lead-in lines. As a result, the subcode CPU will proceed to step 150, and produce VTOC lines, such as lines 151 illustrated in attachment CD for the previous (and final) session. Then, the subcode CPU prepares to read the event list created by the preceding steps by initializing 154 various registers.

As illustrated in more detail with reference to FIG. 5B, the subcode CPU produces subcode information by storing Q channel and P channel information in various registers, and outputting the contents of these registers to the CDX-1 compact disc code processor 90. The event lines produced by the subcode CPU in step 136 (such as event lines 146 and 152 illustrated in attachment C) indicate the manner in which these registers should be manipulated to create the correct P and Q channel outputs during gaps and tracks recorded in the glassmaster.

The registers used in the process by the subcode CPU include (1) a control/address register storing a value for the control/address byte of the Q channel, (2) an absolute time register storing the current absolute elapsed time for the Q channel, (3) a track time register storing the current track elapsed time for the Q channel, (4) a track number register storing the current track number for the Q channel, (5) an index register storing the current index number for the Q channel, (6) an increment/decrement register indicating whether the track time should be incremented or decremented from one sector to the next, and (7) a P channel register storing a binary value (1 or 0) to be output on the P channel. When data is produced by the subcode CPU, values taken from these registers are formatted into a 96 bit Q channel and a P channels which is output on ribbon cable 102 to CDX-1 90 in response to synchronization signals on ribbon cable 102 (see FIG. 3B).

In steps 154 and 148, these various registers are initialized to the appropriate values for the beginning of a disk; thus, for examples the absolute time register is initialized to 00:00:00, i.e., zero elapsed time.

A different procedure is used to generate subcode information to be recorded in the lead-in of a session. To record VTOC information in the lead-in, the subcode CPU reads the VTOC lines (such as lines 145 and 151 illustrated in attachment C) and produces corresponding Q channel subcode information. This procedure is followed until the end of the lead-in, at which point the subcode CPU begins reading event lines (such as lines 146 and 152) to produce P and 0 channel subcode data.

Figure 5B:
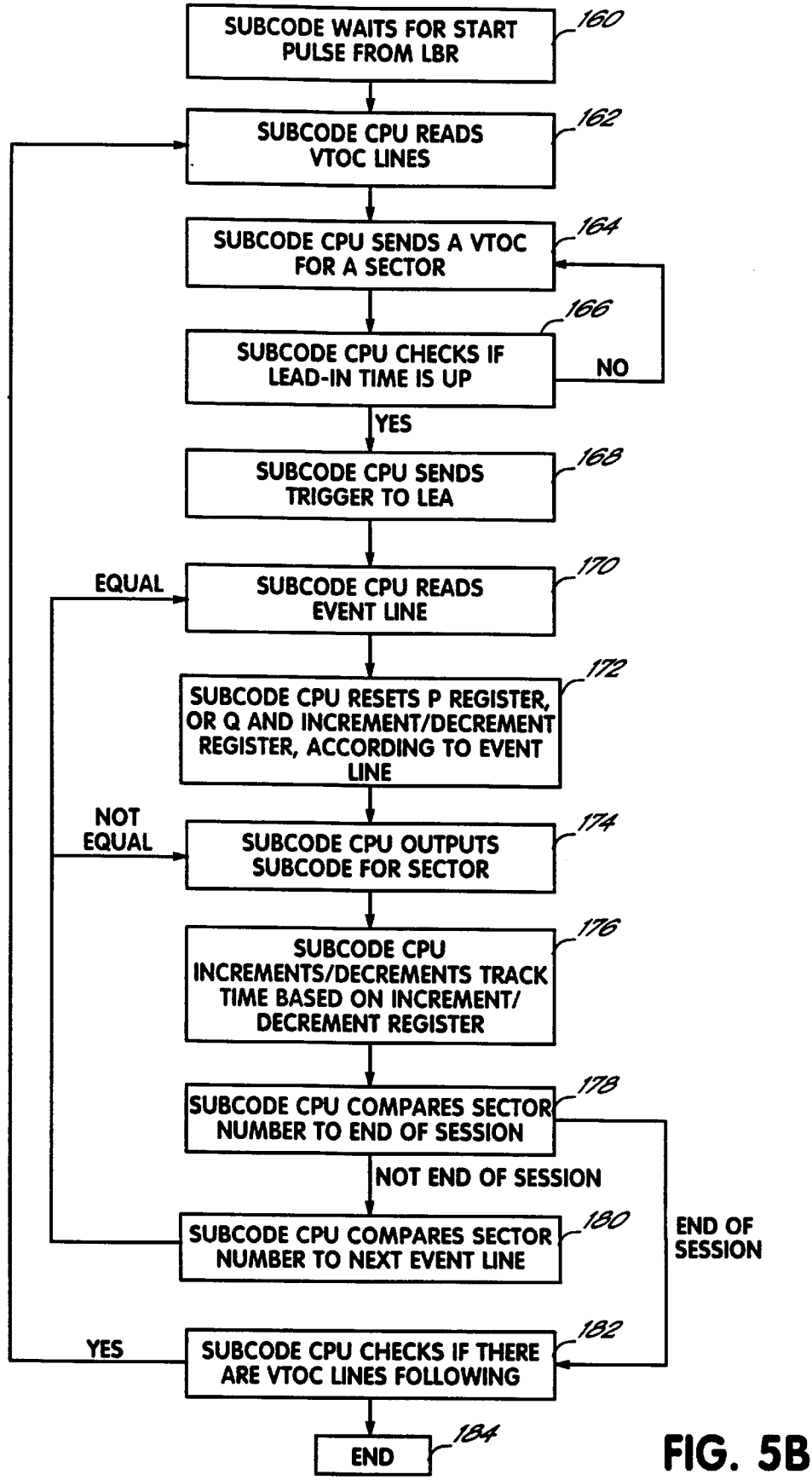

How, specifically referring the FIG. 5B, after the event list has been created and the subcode CPU has initialized its registers, the subcode CPU waits 160 for a start pulse from the laser beam recorder. (The user must initiate writing by starting the LBR.) Upon receiving this start pulse, the subcode CPU reads 162 the VTOC lines, such as lines 145, previously stored in the event list.

As shown in attachment C, each VTOC line identifies data to be stored in the Q channel of one sector of the lead-in of a session on the disc. Each VTOC line identifies all of the information to be encoded into the Q channel of a sector. Thus, the VTOC lines include (1) a value designated "adr" indicating the value of the address nybble of the control/ address byte for the 96 Q channel bits, (2) a value designated "tno" indicating the value of the control nybble of this control/address byte, (3) a value designated "point" indicating the type of pointer which is stored in 96 Q channel bits, and (4) a pointer value, designated as either "min:sec:frm" or "pm:ps:pf" indicating a minute:second:sector pointer to a location on the disc. Pointer types 1, 2, 3, 4 etc. are used to indicate the sector address of the start of the first, second, third, fourth, etc. tracks on the disc. Pointer type a0 is used to indicate the track number of the first track in the session. Pointer type a1 is used to indicate the track number of the last track in the session. Pointer type a2 is used to indicate the address of the start of the lead-out of the session. Pointer type b0 is a "next session" pointer, using a value of 5, or 0101, in the address nybble. For this pointer, min:sec:frm indicates the address of the start of the first track of the next session, and pm:ps:pf indicates the address of the start of the last lead-out on the disc. Pointer type c0 is also a multisession pointer using a value of 5, or 0101 in the address nybble. For this pointer, min:sec:frm indicates the address of the start of the first lead-in of the disc, in this case 99:38:74

(i.e., the highest available address, 99:59:74 minus the length of the lead-in). The sec portion of pointer type c0 may also be used to indicate a disc application code for the session, used for example for access control of individual sessions.

Thus, the first VTOC line 145 illustrated in attachment C indicates that the first track of the session starts at zero minutes two seconds and zero sectors; the fourth VTOC line indicates that the second track begins at six minutes four seconds and 70 sectors, and so on. The thirteenth VTOC line indicates that the first track of the next session starts at twenty minutes thirty-eight seconds and 60 sectors.

The subcode CPU generates subcodes for the lead-in of a session by reading the VTOC lines in sequence, and converting these VTOC lines into appropriately encoded Q channel bits which are serially output to CDX-1 90 (FIG. 3B). After sending 164 VTOC information for the Q channel of a sector, the subcode CPU checks 166 if the lead-in time has been exhausted. If the lead-in has not been fully recorded, the subcode CPU generates additional Q channel information based upon the next VTOC lines, and sends 164 the corresponding encoded Q channel for the next sector. Steps 164 and 166 are repeated, sequentially producing Q channel information corresponding to sequential VTOC lines in the event list, until the entire lead-in has been recorded. (If the subcode CPU reaches the last of the VTOC lines during this process, it will return to the first VTOC line and continue the process from this point.)

As can be seen from the above discussion and attachment C, the result of this process is repetitive recording of VTOC data throughout the lead-in. As seen in attachment C, each VTOC line is effectively repeated three times in a row. Furthermore, as the subcode CPU repeatedly cycles through the VTOC lines while the lead-in is being recorded, the entire set of VTOC lines is repeatedly recorded into the subcode of the lead-in. This repetitive encoding of VTOC data into the lead-in enables a CD player to begin reading the VTOC information starting at any arbitrarily selected location in the lead-in. The player will repetitively received the VTOC information until this information has been verified and stored, at which time the player can skip forward to the first track encoded on the disc.

Once the subcode CPU determines at step 166 that the entire lead-in has been recorded the subcode CPU sends 168 a trigger signal to the LEA 88 via trigger line 94 (FIG. 3B). This causes the LEA 88 to begin producing data on lines 96 and 98 in cooperation with main CPU 84, as discussed above with reference to FIG. 4. At the same time, subcode CPU proceeds to step 170 and reads an event line such as one of event lines 146 shown in attachment C.

As noted above, each event line in the event list, when read, causes the subcode CPU to adjust its P and/or Q channel registers in accordance with instructions in the event line. Thus, for example, in response to the first line 146 shown in attachment C, the subcode CPU will reset its track time register to reflect a track time of two seconds, and will set its increment/decrement register so that this track time will be decremented as each sector is produced. As a result, the first Q channel subcode produced by the subcode CPU will indicate two second track time. The subcode CPU outputs 174 this subcode, which is recorded in first sector after the leadin recorded on the glassmaster 78.

After outputting the subcode for a sector, the subcode CPU increments or decrements 176 its track time register based upon the current value of the increment/decrement register. Texts the subcode CPU compares 178 its current sector number to the sector number of the end of the session.

If the end of the session has not reached, the subcode CPU then compares 180 its current sector number to the sector number identified by next event line. If the next event line has the same sector number as the current sector, the subcode CPU will return to step 170, read the event line and subsequently reset 170 the appropriate registers in accordance with the event line. However, if the current sector number is less than that identified by the next event line the subcode CPU will move to step 174 and immediately output a subcode for the next sector and subsequently increment or decrement 176 a track time as indicated by the current values of the registers.

As can be seen by the event lines in attachment C, the second event line has a sector number of one, thus the second event line will be immediately read after the first event line. The second event line causes the P register to be sent to a one, or on, state. This causes the P channel to transition to an on state for the two second interval between sector 1 and sector 150, as is needed to announce the next track on the disc as illustrated in FIG. 2.

Since the subcode CPU will not read the third event line until sector 150, the P channel will remain in on, and the Q channel track time will decrement toward zero until sector 150, at which time the third event line will be read. The third event line causes the track time register (which has by this time decremented to a zero value) to begin incrementing from this value. The fourth event line, which is read at sector 151, immediately after the third event line, causes the P register to be reset to a zero or off value. Thus, as illustrated in FIG. 2, after the two second audio gap preceding the first track, the Q channel track time begins counting upwards from zero, and the P flag goes to a zero value, indicating the start of the first track.

In a similar manner, subsequent event lines reset the subcode CPU registers as the subcode CPU follows steps 170–180 and produces further subcodes for sectors on the disc. It can be verified with reference to attachment C and FIG. 2 that the subcode behaviors created are exactly those identified in FIG. 2.

When the subcode CPU reaches the end of the session at step 178, it proceeds to step 182. At this step, the subcode CPU checks if there are any VTOC lines remaining in the event list. If so, this indicates that another session follows the session just completed. In response, the subcode CPU returns to step 162 to read these VTOC lines and generate an appropriate VTOC for the lead-in of the new session, and subsequently generate subcode information for the gaps and tracks in the session in response to event lines which follow the VTOC lines.

If, however, at step 182 there are no VTOC lines following, then the subcode CPU determines that it has reached the end of the program material that is to be recorded on the CD, and thus is done 184.

After the subcode CPU and main CPU reach the end of the last session, they cease producing outputs to the CDX-1 compact disc code processor 90. Upon detecting this, the CDX-1 90 produces random 1 and 0 bits on input 72 to the LBR 74, so that the remainder of the glassmaster is written with a random pattern. This random pattern gives the resulting disk a visually pleasing appearance as compared with, for example not encoding data on the unused portion of the disc, which would leave a mirror-like outer region on the disk which has been found to be displeasing to consumers.

After the glassmaster 78 has thus been completely written with data, the glassmaster 78 is removed from the LBR 74, and through subsequent processing steps is used to mass produce discs containing the multisession encoded audio and non-audio data.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicantas general inventive concept.

What is claimed is:

1. A method of mass-producing a compact disc comprising forming lands and pits in a first annular portion of said disc, digitally encoding a first table of contents identifying a location of first stored data on said disc, and at least one additional pointer, forming lands and pits in a second annular portion of said disc adjacent said first portion, digitally encoding said first stored data, forming lands and pits in a third annular portion of said disc adjacent said second portion, digitally encoding a second table of contents identifying a location of second stored data on said disc, forming lands and pits in a fourth annular portion of said disc adjacent said third portion, digitally encoding said second stored data, wherein said lands and pits formed in said first annular portion of said disc identify one or more locations within said second annular portion of said disc but only one location outside said second annular portion of said disc.

2. The method of mass-producing a compact disc of claim 1, wherein said first stored data includes audio data and said second stored data includes non-audio data.

3. The method of mass-producing a compact disc of claim 2, wherein said first stored data includes only audio data, such that an audio-only compact disc player will play said audio data from said disc without playing said non-audio data.

4. The method of mass-producing a compact disc of claim 1, wherein said lands and pits of said disc are formed in sectors each comprising ninety-eight frames of data, each frame comprising a data segment, error correction coding segments, and a synchronization or subcode segment.

5. The method of mass-producing a compact disc of claim 4 wherein said first and second tables of contents are digitally encoded in subcode segments of sectors formed in said first and third portions of said disc.

6. The method of mass-producing a compact disc of claim 1 wherein said lands and pits are formed in spiral tracks through said annular portions.

7. The method of mass-producing a compact disc of claim 1, wherein said pointer identifying a location of said second stored data and said table of contents are digitally encoded in subcode segments formed in said first annular portion of said disc.

8. A method of mass-producing a multisession compact disc storing audio data and non-audio data for playback on an audio-only or CD-ROM compact disc player, comprising forming lands and pits in a first annular lead-in portion of said disc, digitally encoding a first table of contents identifying a location of said audio data on said disc and at least one additional pointer, forming lands and pits in an annular audio track portion of said disc adjacent said first annular lead-in portion, digitally encoding said audio data, forming lands and pits in a first annular lead-out portion of said disc adjacent said annular audio track portion, digitally indicating an end of said annular audio track portion, forming lands and pits in a second annular lead-in portion of said disc adjacent said first annular lead-out portion, digitally encoding a second table of contents identifying a location of said non-audio data on said disc, forming lands and pits in an annular non-audio track portion of said disc adjacent said second annular lead-in portion, digitally encoding said non-audio data, and forming lands and pits in a second annular lead-out portion of said disk adjacent said annular non-audio track portion, digitally indicating an end of said annular non-audio track portion, wherein said lands and pits formed in said first annular lead-in portion of said disc identify one or more locations within said annular audio track portion of said disc but only one location outside said annular audio track portion of said disc.

9. The method of mass-producing a multisession compact disc of claim 8, wherein said portions each are formed to comprise a number of sectors of lands and pits of said multisession compact disc, each sector comprising ninety-eight frames of data, each frame comprising a data segment, error correction coding segments, and a synchronization or subcode segment.

10. The method of mass-producing a multisession compact disc of claim 9 wherein said first and second tables of contents are digitally encoded in subcode segments of sectors formed in said first and second annular lead-in portions of said disc.

11. The method of mass-producing a multisession compact disc of claim 8 wherein said lands and pits are formed in spiral tracks through said annular portions.

12. The method of mass-producing a multisession compact disc of claim 8, wherein said pointer identifying a location of said annular non-audio track portion of said disc and said table of contents are digitally encoded in a subcode of said lands and pits formed in said first annular lead-in portion of said disc.

13. The method of mass-producing a compact disc of claim 12 wherein said digitally-encoded pointer is encoded in a O-channel subcode, said O-channel subcode including an address nybble not recognized by audio-only compact disc players.

14. The method of mass-producing a compact disc of claim 8 wherein said digitally-encoded pointer is encoded in a O-channel subcode, said O-channel subcode including an address nybble not recognized by audio-only compact disc players.

* * * * *

UNITED STATES PATENT AND TRADEMARK OFFICE
CERTIFICATE OF CORRECTION

PATENT NO. : 5,905,709

DATED : May 18, 1999

INVENTOR(S) : Reinhard Blaukovitsch

It is certified that error appears in the above-identified patent and that said Letters Patent is hereby corrected as shown below:

Column 2, line 11 reads "CD-RO[]s" and should read --CD-ROMs--

Column 3, line 8 reads "CD-ROW" and should read --CD-ROM--

Column 3, line 12 reads "CD-ROH" and should read --CD-ROM--

Column 3, line 21 reads "subeode" and should read --subcode--

Column 7, line 39 reads "nrext" and should read --next--

Column 7, line 52 reads "lasers" and should read --laser--

Column 8, line 47 reads "CD-ROE" and should read --CD-ROM--

Column 9, line 21 reads "DHC-1100" and should read --DMC-1100--

UNITED STATES PATENT AND TRADEMARK OFFICE
CERTIFICATE OF CORRECTION

PATENT NO. : 5,905,709
DATED : May 18, 1999
INVENTOR(S) : Reinhard Blaukovitsch It is certified that error appears in the above-identified patent and that said Letters Patent is hereby corrected as shown below:

Column 9, line 35 reads "75SM121" and should read --75SN121--

Column 10, line 29 reads "to the to the" and should read --to the--.

Column 10, line 61 reads "EFH" and should read --EFM--

Column 11, line 3 reads "HS-DOS" and should read --MS-DOS--

Column 11, line 23 reads "Hbytes." and should read --MBytes,--

Column 12, line 65 reads "11C" and should read --110--

Column 13, line 56 reads "attachment CD" and should read --attachment C,--

Column 14, line 17 reads "a P channels" and should read --a P channel--

Column 14, line 32 reads "O" and should read --Q--

UNITED STATES PATENT AND TRADEMARK OFFICE
CERTIFICATE OF CORRECTION

PATENT NO. : 5,095,709
DATED : May 18, 1999
INVENTOR(S) : Reinhard Blaukovitsch

It is certified that error appears in the above-identified patent and that said Letters Patent is hereby corrected as shown below:

Column 15, line 39 reads "will repetitively received the" and should read -- will repetitively receive--.

Column 15, line 62 reads "after the leadin" and should read --after the lead-in- Column 15, line 66 reads "Texts the subcode" and should read --Next, the subcode--

Column 17, line 15 reads "applicantas general inventive" and should read -- applicant's general inventive--

Signed and Sealed this

Fifteenth Day of February, 2000

Attest:

Q. TODD DICKINSON

*Attesting Officer*  *Commissioner of Patents and Trademarks*